US010040719B2

(12) United States Patent
Eby et al.

(10) Patent No.: US 10,040,719 B2
(45) Date of Patent: Aug. 7, 2018

(54) LOW SOLAR TRANSMITTANCE COATINGS (71) Applicant: Cardinal CG Company, Eden Prairie, MN (US)

(72) Inventors: Eric H. Eby, Lone Rock, WI (US); Klaus H. W. Hartig, Avoca, WI (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

(21) Appl. No.: 14/371,242

(22) PCT Filed: Jan. 16, 2013

(86) PCT No.: PCT/US2013/021667
§ 371 (c)(1),
(2) Date: Jul. 9, 2014

(87) PCT Pub. No.: WO2013/109582
PCT Pub. Date: Jul. 25, 2013

(65) Prior Publication Data
US 2015/0004369 A1 Jan. 1, 2015

Related U.S. Application Data (60) Provisional application No. 61/587,384, filed on Jan. 17, 2012.

(51) Int. Cl.
*B32B 17/10* (2006.01)
*C03C 17/36* (2006.01)
(Continued)

(52) U.S. Cl.
CPC ...... *C03C 17/366* (2013.01); *B32B 17/10036* (2013.01); *B32B 17/10201* (2013.01);
(Continued)

(58) Field of Classification Search
CPC ....... Y10T 428/2495; Y10T 428/24975; Y10T 428/31678; B32B 17/10036;
(Continued)

(56) References Cited

U.S. PATENT DOCUMENTS 3,453,161 A * 7/1969 Golightly .......... B32B 17/10889
428/38
3,458,388 A * 7/1969 Moynihan ..................... 428/214
(Continued)

FOREIGN PATENT DOCUMENTS

| EP | 0847965 A1 | 6/1998 |
| WO | 9748649 A1 | 12/1997 |
| WO | 2009029466 A1 | 3/2009 |

OTHER PUBLICATIONS

"Zinc oxide", Wikpedia, Nov. 3, 2010, web.archive.org/web/20101103060809/http://en.wikipedia.org/wiki/Zinc_oxide.*
(Continued)

*Primary Examiner* — Maria V Ewald
*Assistant Examiner* — Ethan A. Utt
(74) *Attorney, Agent, or Firm* — Fredrikson & Byron, P.A.

(57) ABSTRACT

The invention provides low solar transmittance coatings that have particularly low solar transmittance. The coating includes three infrared-reflection film regions, which may each comprise silver. In some cases, the coating is incorporated into a laminated glass assembly.

12 Claims, 5 Drawing Sheets

(51) Int. Cl.
  *B32B 37/06* (2006.01)
  *B32B 37/10* (2006.01)
  *B32B 37/24* (2006.01)
  *B32B 38/18* (2006.01)
  *C03C 23/00* (2006.01)
  *G02B 1/11* (2015.01)

(52) U.S. Cl.
  CPC .. *B32B 17/10229* (2013.01); *B32B 17/10761* (2013.01); *B32B 37/06* (2013.01); *B32B 37/10* (2013.01); *B32B 37/24* (2013.01); *B32B 38/1866* (2013.01); *C03C 17/36* (2013.01); *C03C 17/3626* (2013.01); *C03C 17/3639* (2013.01); *C03C 17/3644* (2013.01); *C03C 17/3652* (2013.01); *C03C 17/3681* (2013.01); *C03C 23/007* (2013.01); *G02B 1/11* (2013.01); *B32B 2037/243* (2013.01); *B32B 2309/022* (2013.01); *B32B 2311/08* (2013.01); *Y10T 428/2495* (2015.01); *Y10T 428/24628* (2015.01); *Y10T 428/24975* (2015.01)

(58) Field of Classification Search
  CPC ........ B32B 17/10229; B32B 17/10761; B32B 17/00; B32B 17/06; B32B 17/061; B32B 17/064; B32B 17/10; B32B 17/10615; B32B 17/10174; B32B 17/10201; B32B 17/1022; B32B 18/00; B32B 9/00; B32B 9/04; B32B 9/041; B32B 9/045; B32B 15/00; B32B 15/04; B32B 15/043; C03C 17/3668; C03C 17/3681; C03C 17/34; C03C 17/36; C03C 17/22; C03C 17/23; C03C 17/00; C03C 17/225; C03C 17/245; C03C 17/2453; C03C 17/2456; C03C 17/25; C03C 17/253; C03C 17/256; C03C 14/3411; C03C 17/3429; C03C 17/3435; C03C 17/3602; C03C 17/3605; C03C 17/3607; C03C 17/361; C03C 17/3613; C03C 17/3615; C03C 17/3618; C03C 17/3626; C03C 17/3639; C03C 17/3642; C03C 17/3644; C03C 17/3647; C03C 17/3649; C03C 17/3652; C03C 17/3657; C03C 17/366; C03C 17/3411
  USPC ....... 428/213, 216, 426, 432, 433, 434, 457, 428/469, 472, 688, 689, 697, 698, 699, 428/701, 702
  See application file for complete search history.

(56) References Cited

U.S. PATENT DOCUMENTS

| | | | |
|---|---|---|---|
| 4,619,729 | A | 10/1986 | Johncock et al. |
| 4,710,426 | A * | 12/1987 | Stephens ............... C03C 17/42 428/469 |
| 4,737,379 | A | 4/1988 | Hudgens et al. |
| 4,898,789 | A | 2/1990 | Finley |
| 4,902,081 | A | 2/1990 | Huffer |
| 4,996,105 | A | 2/1991 | Oyama et al. |
| 5,059,295 | A | 10/1991 | Finley |
| 5,071,206 | A | 12/1991 | Hood et al. |
| 5,270,517 | A | 12/1993 | Finley |
| 5,296,302 | A | 3/1994 | O'Shaughnessy et al. |
| 5,337,191 | A | 8/1994 | Austin |
| 5,505,825 | A | 4/1996 | Gold et al. |
| 5,756,192 | A * | 5/1998 | Crawley et al. ............ 428/216 |
| 5,821,001 | A | 10/1998 | Arbab et al. |
| 5,902,505 | A | 5/1999 | Finley |
| 5,942,338 | A | 8/1999 | Arbab et al. |
| 6,010,602 | A | 1/2000 | Arbab et al. |
| 6,042,934 | A | 3/2000 | Guiselin et al. |
| 6,090,481 | A | 7/2000 | Depauw et al. |
| 6,355,334 | B1 | 3/2002 | Rondeau et al. |
| 6,495,263 | B2 | 12/2002 | Stachowiak |
| 6,558,800 | B1 | 5/2003 | Stachowiak |
| 6,582,809 | B2 | 6/2003 | Boire et al. |
| 6,692,831 | B2 | 2/2004 | Stachowiak |
| 6,833,194 | B1 | 12/2004 | O'Shaughnessy |
| 6,863,928 | B2 | 3/2005 | Stachowiak |
| 6,899,953 | B1 | 5/2005 | O'Shaughnessy et al. |
| 6,919,133 | B2 | 7/2005 | Hartig et al. |
| 7,005,189 | B1 * | 2/2006 | Tachibana ........... C03C 17/3639 428/432 |
| 7,232,615 | B2 | 6/2007 | Buhay et al. |
| 7,294,404 | B2 | 11/2007 | Krisko et al. |
| 7,329,433 | B2 | 2/2008 | O'Shaughnessy et al. |
| 7,335,421 | B2 * | 2/2008 | Thiel ................. B32B 17/10229 428/432 |
| 7,339,728 | B2 * | 3/2008 | Hartig ..................... C03C 17/36 359/359 |
| 7,413,768 | B2 | 8/2008 | O'Shaughnessy |
| 7,419,725 | B2 | 9/2008 | Neuman et al. |
| 7,452,603 | B2 | 11/2008 | Fleury et al. |
| 7,473,471 | B2 | 1/2009 | Finley et al. |
| 7,572,510 | B2 * | 8/2009 | Hartig ..................... C03C 17/36 428/432 |
| 7,572,511 | B2 * | 8/2009 | Hartig ..................... C03C 17/36 428/432 |
| 7,588,829 | B2 | 9/2009 | Finley et al. |
| 7,604,865 | B2 | 10/2009 | Krisko et al. |
| 7,713,587 | B2 | 5/2010 | Finley et al. |
| 7,713,632 | B2 | 5/2010 | Krisko et al. |
| 7,807,248 | B2 * | 10/2010 | German .................. C03C 17/36 428/432 |
| 7,820,296 | B2 | 10/2010 | Myli et al. |
| 7,820,309 | B2 | 10/2010 | Myli et al. |
| 7,862,910 | B2 | 1/2011 | Krisko et al. |
| 7,906,203 | B2 | 3/2011 | Hartig |
| 7,923,114 | B2 | 4/2011 | Myli et al. |
| 7,972,713 | B2 | 7/2011 | Fleury et al. |
| 8,025,957 | B2 * | 9/2011 | Thiel ................. B32B 17/10174 428/432 |
| 8,088,473 | B2 | 1/2012 | Hartig |
| 8,092,660 | B2 | 1/2012 | Myli et al. |
| 8,420,207 | B2 * | 4/2013 | Reutler ............. B32B 17/10174 428/213 |
| 8,658,262 | B2 | 2/2014 | Myli et al. |
| 2003/0180547 | A1 | 9/2003 | Buhay et al. |
| 2003/0228476 | A1 | 12/2003 | Buhay et al. |
| 2004/0247929 | A1 | 12/2004 | Buhay et al. |
| 2005/0238923 | A1 | 10/2005 | Thiel |
| 2006/0280951 | A1 | 12/2006 | Fleury et al. |
| 2007/0020465 | A1 | 1/2007 | Thiel et al. |
| 2007/0081227 | A1 | 4/2007 | Hartig |
| 2007/0081228 | A1 | 4/2007 | Hartig |
| 2007/0082124 | A1 | 4/2007 | Hartig |
| 2007/0082169 | A1 * | 4/2007 | Hartig ..................... C03C 17/36 428/432 |
| 2007/0082206 | A1 * | 4/2007 | Hartig ..................... C03C 17/36 428/432 |
| 2007/0082219 | A1 | 4/2007 | Fleury et al. |
| 2007/0116967 | A1 | 5/2007 | Medwick et al. |
| 2007/0188871 | A1 | 8/2007 | Fleury et al. |
| 2007/0224357 | A1 | 9/2007 | Buhay et al. |
| 2007/0264479 | A1 | 11/2007 | Thiel et al. |
| 2008/0280147 | A1 | 11/2008 | Thiel |
| 2009/0011205 | A1 | 1/2009 | Thiel et al. |
| 2009/0047466 | A1 * | 2/2009 | German .................. C03C 17/36 428/98 |
| 2009/0130409 | A1 * | 5/2009 | Reutler ............. B32B 17/10174 428/213 |
| 2010/0203239 | A1 | 8/2010 | Finley et al. |
| 2011/0236663 | A1 | 9/2011 | Fleury et al. |

OTHER PUBLICATIONS

Cleveland, Cutler J. Morris, Christopher. (2009). Dictionary of Energy (Expanded Edition)—optical thickness. Elsevier. Online

(56) References Cited

OTHER PUBLICATIONS version available at: app.knovel.com/hotlink/pdf/id:kt007SXBZ1/dictionary-energy-expanded/optical-thickness.*
Strubble, Rob, "Shipments of ALARBAN 70XL Glass by PPG Surpass 94 Million Square Feet," Jun. 7, 2011, 1 page.
PCT International Search Report and Written Opinio dated Apr. 29, 2013 for Intl. App. No. PCT/US2013/021667, from which the instant application is based, 14 pgs.

* cited by examiner

Fig. 5

LOW SOLAR TRANSMITTANCE COATINGS

RELATED APPLICATIONS

This application is a 35 U.S.C. 371 national stage filing from International Application No. PCT/US2013/021667 filed Jan. 16, 2013, which claims priority to U.S. Provisional Application No. 61/587,384 filed Jan. 17, 2012, the teachings of which are incorporated herein by reference.

FIELD OF THE INVENTION

The present invention relates to thin film coatings for glass and other substrates. In particular, this invention relates to low solar transmittance coatings. Also provided are methods and equipment for depositing such coatings, as well as laminated glass assemblies incorporating such a coating.

BACKGROUND OF THE INVENTION

Low solar transmittance coatings are well known in the art. Typically, they include one or two layers of infrared-reflective film and two or more layers of transparent dielectric film. The infrared-reflective film, which will commonly be a conductive metal like silver, gold, or copper, reduces the transmission of heat and light through the coating. The dielectric film is used to antireflect the infrared-reflective film for part of the visible light, and to control other properties and characteristics of the coating, such as color and durability. Commonly used dielectric materials include oxides of zinc, tin, indium, bismuth, and titanium, among others.

The production of such layer stacks involves thin films of precisely uniform optical properties. Most commercially available coatings for management of visible solar light and flow of heat in and out of windows have one or two silver layers each sandwiched between two coats of transparent dielectric film. Increasing the number of silver films in a coating can be used to increase its selectivity to transmit and reflect spectral parts of the total solar radiation and increase reflectivity for other far infrared radiation. However, this can also reduce the visible light transmission of the coating, and/or negatively impact the color of the coating, and/or decrease the durability of the coating. Perhaps for these reasons and the requirements for high precision of the coating process, low solar energy transmittance coatings with three silver layers did not find much place in the market historically.

Some triple-silver low solar transmittance coatings are now available commercially, and others are known from the patent literature. While some of these coatings have been quite advantageous, there is room for continued development. For example, it would be advantageous to provide new triple-IR-layer film stacks that can provide particularly low solar energy transmittance resulting in a low solar heat gain coefficient, while at the same time achieving good visible transmittance. Further, it would be desirable to provide a triple-IR-layer coating that is optimized for providing particularly low solar energy transmittance in combination with high visible transmittance and other desired properties (e.g., desired color properties) when laminated. For example, it would be desirable to provide such a triple-IR-layer coating that can provide controlled property changes (e.g., small or otherwise controlled optical property changes) upon being laminated. In some cases, it would be desirable to provide a triple-IR-layer coating that is durable to heat-bending and also exhibits the foregoing properties and characteristics. In some embodiments, it would be desirable to provide a triple-IR-layer coating that is optimized for use in glazing units equipped with additional coatings on the surfaces exposed to an outdoor environment, an indoor environment, or both, while at the same time exhibiting some or all of the foregoing properties and characteristics.

SUMMARY OF THE INVENTION

In certain embodiments, the invention provides a laminated glass assembly including two panes and an interlayer. One of the panes has a major surface bearing a low solar transmittance coating. The low solar transmittance coating comprises a first infrared-reflection film region, a second infrared-reflection film region, and a third infrared-reflection film region. The coating comprises, in sequence moving away from the noted major surface: a) a first transparent dielectric film region having an optical thickness, b) the first infrared-reflection film region, c) a second transparent dielectric film region having an optical thickness, d) the second infrared-reflection film region, e) a third transparent dielectric film region having an optical thickness, f) the third infrared-reflection film region, and g) a fourth transparent dielectric film region having an optical thickness. (The coating might optionally further include thin transitional layers separating the infrared-reflection film regions from the transparent dielectric film regions. Such transitional regions might transition from being more metallic adjacent to the IR film to having more dielectric properties further away from the IR film) In the present embodiments, the three infrared-reflection film regions have thicknesses that provide the laminated glass assembly with a solar transmittance of less than 0.34 and yet the laminated glass assembly has a visible transmittance of greater than 0.705. Preferably, the three infrared-reflection film regions have a combined thickness of greater than 300 Å and yet the laminated glass assembly exhibits a Delta $T_{vis,\ lami}$ of less than about 4%. Further, in the present embodiments, the combined thickness of the three infrared-reflection film regions is greater than 300 Å in combination with the third infrared-reflection film region being thinner than the second infrared-reflection film region.

Certain embodiments of the invention provide a laminated glass assembly including two panes and an interlayer. One of the panes has a major surface bearing a low solar transmittance coating. The low solar transmittance coating comprises a first infrared-reflection film region, a second infrared-reflection film region, and a third infrared-reflection film region. The coating comprises, in sequence moving away from the noted major surface: a) a first transparent dielectric film region having an optical thickness, b) the first infrared-reflection film region, c) a second transparent dielectric film region having an optical thickness, d) the second infrared-reflection film region, e) a third transparent dielectric film region having an optical thickness, f) the third infrared-reflection film region, and g) a fourth transparent dielectric film region having an optical thickness. In the present embodiments, the three infrared-reflection film regions have thicknesses that provide the laminated glass assembly with a solar transmittance of less than 0.32 and yet the laminated glass assembly has a visible transmittance of greater than 0.705. Preferably, the three infrared-reflection film regions have a combined thickness of greater than 350 Å and yet the laminated glass assembly exhibits a Delta $T_{vis,\ lami}$ of less than about 4%. Further, in the present embodiments, it is preferable that the combined thickness of the three infrared-reflection film regions be greater than 350 Å in combination with the third infrared-reflection film region being thinner than the second infrared-reflection film region. In some of the present embodiments, the thickness of the first infrared-reflection film region is from 85 to 140 Å, while the thickness of the second infrared-reflection film region is from 120 to 180 Å, and the thickness of the third infrared-reflection film region is from 110 to 170 Å.

Some embodiments of the invention provide a method of making a laminated glass assembly comprising two panes and an interlayer. One of the panes has a major surface bearing a low solar transmittance coating. The low solar transmittance coating comprises a first infrared-reflection film region having a thickness, a second infrared-reflection film region having a thickness, and a third infrared-reflection film region having a thickness. The coating comprises, in sequence moving away from said major surface: a) a first transparent dielectric film region having an optical thickness, b) the first infrared-reflection film region, c) a second transparent dielectric film region having an optical thickness, d) the second infrared-reflection film region, e) a third transparent dielectric film region having an optical thickness, f) the third infrared-reflection film region, and g) a fourth transparent dielectric film region having an optical thickness. In the present embodiments, the method includes providing a sandwich wherein the interlayer is located between the two panes and wherein the noted major surface bearing the low solar transmittance coating is carried against the interlayer, and performing a glass lamination operation on the sandwich so as to laminate the two panes together via the interlayer. In the present method, the three infrared-reflection film regions have thicknesses that provide the resulting laminated glass assembly with a solar transmittance of less than 0.34 and yet a visible transmittance of greater than 0.705. Preferably, the three infrared-reflection film regions have a combined thickness of greater than 300 Å and yet the laminated glass assembly undergoes a Delta $T_{vis,\ lami}$ of less than 5% as a result of the glass lamination operation. Further, the combined thickness of the three infrared-reflection film regions preferably is greater than 300 Å in combination with the third infrared-reflection film region being thinner than the second infrared-reflection film region.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The present low solar transmittance coating 7 has a number of beneficial properties. The ensuing discussion reports some of these properties. In some cases, properties are reported for a single (e.g., monolithic) pane 12 bearing the present coating 7 on one surface 18. In other cases, properties are reported for a laminated glass assembly 33 wherein two panes 12, 12' are laminated together with an interlayer 16, and where the present coating 7 is on the interior surface 18 of the outboard pane 12. In such cases, the reported properties reflect use of two clear 2.2 mm soda-lime float glass panes and a 0.015 inch PVB interlayer, and the laminated glass assembly for which the properties are reported is a heat-bent laminated glass assembly. These details (which surface the coating is on, the thickness of the panes, what material is used for the interlayer, that the panes are both clear, that the laminated glass is bent, etc.) are not limiting to the invention. For example, the two panes 12, 12' will commonly be 1.8 mm glass, and the interleaving 16 thickness will commonly be 0.03 inch (these examples are not limiting either). Absent an express statement to the contrary, the present discussion reports determinations made using the well known WINDOW 6.3 computer program (e.g., calculating center of glass data) under standard ASHRAE conditions.

The present coating 7 can provide exceptionally low solar transmittance values. For example, the present laminated glass assembly 33 can have a solar transmittance of less than 0.44. Preferably, the solar transmittance of the present laminated glass assembly 33 is less than 0.4 (e.g., less than 0.375, or less than 0.35). While the desired level of solar transmittance can be selected and varied to accommodate different applications, certain preferred embodiments (e.g., using the exemplary film stack tabulated below and the panes 12, 12' and interlayer 16 specified above) provide the present laminated glass assembly with a solar transmittance of less than 0.32, e.g., about 0.29-0.3.

The term "solar transmittance" is used herein in accordance with its well known meaning. As is well known, the solar transmittance of a glazing is the percentage of the weighted average of the solar radiation from 300 nm to 2500 nm that is passed through the glazing. Reference is made to NFRC 300-2010 (2010), the entire teachings of which are incorporated herein by reference. The solar transmittance can be calculated using the methodology embedded in the well known WINDOW 6.3 computer program.

Similarly, the present coating 7 can provide good solar heat gain properties. As is well known, the solar heat gain coefficient (SHGC) of a glazing is the fraction of incident solar radiation (energy) that is admitted through the glazing. There are a number of applications where low solar heat gain glazings are of particular benefit. In warm climates, for example, it is especially desirable to have low solar heat gain windows. For example, solar heat gain coefficients of about 0.4 and below are generally recommended for buildings in the southern United States. Further, windows and other glazings that are exposed to a lot of undesirable sun benefit from having a low solar heat gain coefficient. Windows on the east or west side of a building, for instance, tend to get a lot of sun in the morning and afternoon. For applications like these, the solar heat gain coefficient plays a vital role in maintaining a comfortable environment within the building. Thus, it is particularly beneficial to provide windows of this nature with coatings that establish a low solar heat gain coefficient (i.e., low solar heat gain coatings). Low solar heat gain coatings are desirable for many applications.

A tradeoff is sometimes made in low solar heat gain coatings whereby the films selected to achieve a low SHGC have the effect of decreasing the visible transmittance to a lower level than is ideal, increasing the visible reflectance to a higher level than is ideal, and/or creating suboptimal color properties. As a consequence, windows bearing these coatings may have unacceptably low visible transmission, a somewhat mirror-like appearance, and/or objectionable color properties.

The present coating 7 can provide a low solar heat gain coefficient. For example, the solar heat gain coefficient of the present laminated glass assembly 33 can be less than 0.4. Preferably, the present laminated glass assembly has a solar heat gain coefficient of less than 0.39 (e.g., 0.38 or less, or even less than 0.37 in some cases). While the desired SHGC level can be selected and varied to accommodate different applications, some preferred embodiments (e.g., using the exemplary film stack tabulated below and the panes 12, 12' and interlayer 16 specified above) provide the present laminated glass assembly 33 with a solar heat gain coefficient of about 0.36-0.38.

The term "solar heat gain coefficient" is used herein in accordance with its well known meaning. Reference is made to NFRC 300-2010 (2010). The SHGC can be calculated using the methodology embedded in the well known WINDOW 6.3 computer program.

In combination with the beneficial properties discussed above, the present coating 7 has exceptional optical properties. As noted above, a tradeoff is sometimes made in low solar heat gain coatings whereby the films selected to achieve good solar control properties have the effect of restricting the visible transmission to a level that is lower than ideal.

To the contrary, the present coating 7 can provide an exceptional combination of high visible transmittance, low solar transmittance, and low SHGC. For example, the present laminated glass assembly 33 can have a visible transmittance $T_{vis}$ of greater than 0.45. Preferably, the present laminated glass assembly has a visible transmittance $T_{vis}$ of greater than 0.55 (e.g., greater than 0.66). While the desired level of visible transmittance can be selected and varied to accommodate different applications, certain preferred embodiments (e.g., using the exemplary film stack tabulated below and the panes 12, 12' and interlayer 16 specified above) provide the laminated glass assembly with a visible transmittance of greater than 0.705, or greater than 0.7075, such as about 0.71-0.72.

Thus, in certain preferred embodiments, the film thicknesses and compositions in the present coating 7 are selected (in combination with selecting the materials for the panes 12, 12' and the interlayer 16) to provide the present laminated glass assembly 33 with a visible transmittance of greater than 0.705, greater than 0.7075, or perhaps optimally 0.71 or more. As just one example, the exemplary film stack tabulated below, when used in the present laminated glass assembly 33 comprising the panes 12, 12' and interlayer 16 specified above (the details of which are non-limiting), provides a visible transmittance (or "$T_{vis}$") of about 0.71-0.72.

The term "visible transmittance" is well known in the art and is used herein in accordance with its well-known meaning. Visible transmittance can be determined in accordance with NFRC 300-2010 (2010). The well known WINDOW 6.3 computer program can be used in calculating these and other reported optical properties.

Figure 3:
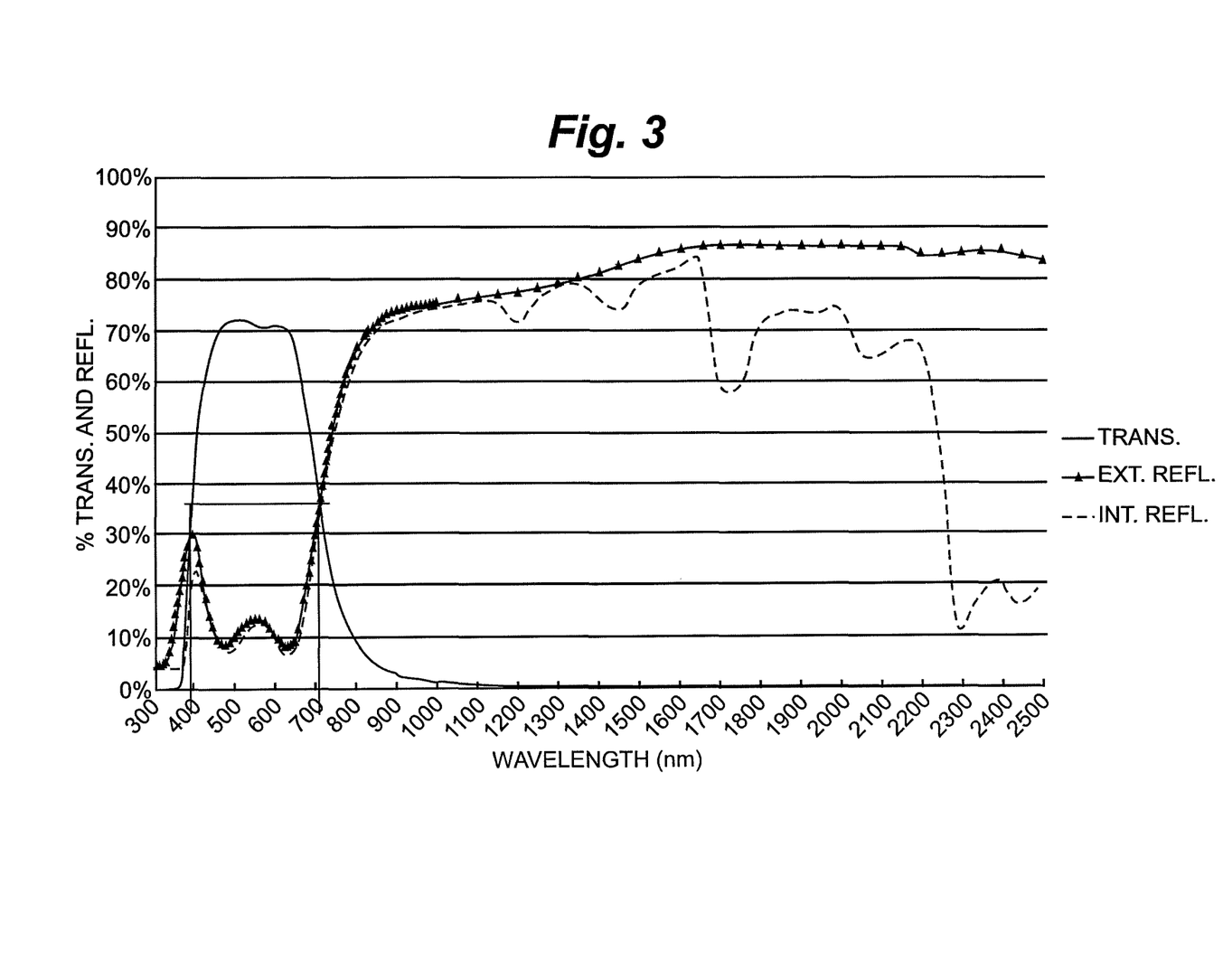
FIG. 3 is a graph showing the spectral properties of a laminated glass assembly that includes a low solar transmittance coating in accordance with certain embodiments of the invention.

Preferably, the coated substrate (i.e., the present pane) 12 and the present laminated glass assembly 33 each have a spectral transmission curve with a peak transmission located in the visible wavelength range. In certain embodiments, this spectral transmission curve has a halfwidth of less than 360 nm, less than 350 nm, less than 340 nm, or even less than 330 nm. In these embodiments, the coating 7 provides a highly advantageous narrow transmission curve, which desirably has high visible transmittance spanning the visible range and, at the same time, provides a steep slope between highly transmitted visible wavelengths and highly reflected infrared wavelengths. In certain embodiments, the coating 7 additionally (i.e., together with having any maximum halfwidth noted above) or alternatively achieves a halfwidth that is greater than 100 nm, greater than 200 nm, or even greater than 300 nm. This can be desirable in providing high levels of visible transmittance over a substantial portion of the visible spectrum. Reference is made to FIG. 3, which shows the transmission curve (as well as the exterior and interior reflection curves) for the present laminated glass assembly 33 when using the film stack tabulated below and the panes 12, 12' and interlayer 16 specified above. Conventional use of the term "halfwidth" is made herein as follows: one determines the maximum visible transmission on the transmission curve (e.g., 72%), and then measures the width of the curve at the percentage that is half of that maximum transmission (i.e., at the location on the vertical axis that is 50% of the maximum transmission, e.g., at 36%).

The present coating 7 can provide good efficiency in terms of the low solar heat gain coefficient that is achieved in combination with high visible transmission (which properties of course depend also on other factors, such as the glazing application, e.g., laminated versus IGU). The ratio of visible transmittance (as a fraction of unity) over SHGC is referred to herein as the light to solar gain ratio. For the present laminated glass assembly 33, this ratio preferably is greater than 1.75, greater than 1.8, and in some cases even greater than 1.9. Certain preferred embodiments (e.g., where the coating 7 is the exemplary film stack tabulated below and the panes 12, 12' and interlayer 16 are as specified above) provide the present laminated glass assembly 33 with a light to solar gain ratio of greater than 1.8 but less than 2.5, such as about 1.85-2.2.

The present laminated glass assembly 33 can also achieve exceptional visible reflectance properties. For example, the present laminated glass assembly 33 can have an exterior visible reflectance $R_{vis,\ ext}$ of less than 0.15 (e.g., less than 0.13). As is well known, the "exterior" visible reflectance is measured off the exterior side ES of the laminate. While the desired level of exterior visible reflectance can be selected and varied to accommodate different applications, certain preferred embodiments (e.g., using the exemplary film stack tabulated below and the panes 12, 12' and interlayer 16 specified above) provide the laminated glass assembly 33 with an exterior visible reflectance $R_{vis,\ ext}$ of less than 0.12, such as about 0.09-0.10.

The present laminated glass assembly 33 can also provide an exceptionally low interior visible reflectance $R_{vis,\ int}$. For example, the assembly 33 preferably has an interior visible reflectance $R_{vis, int}$ of less than 0.13 (e.g., less than 0.12). As is well known, the "interior" visible reflectance is measured off the interior side IS of the laminate. While the desired level of interior visible reflectance can be selected and varied to accommodate different applications, certain preferred embodiments (e.g., using the exemplary film stack tabulated below and the panes 12, 12' and interlayer 16 specified above) provide the laminated glass assembly 33 with an interior visible reflectance $R_{vis, int}$ of less than 0.10, such as about 0.08-0.09.

The term "visible reflectance" is well known in the art. This term is used herein in accordance with its well-known meaning. The reported visible reflectance data are measured off a central portion of the noted side of the laminated glass assembly. As noted above, visible reflectance can be determined in accordance with NFRC 300-2010 (2010). The well known WINDOW 6.3 computer program can be used in calculating visible reflectance properties.

In the present laminated glass embodiments, in addition to providing high visible transmittance in combination with low solar transmittance and low SHGC, the resulting laminate can achieve exceptional color properties. For example, the present laminate can achieve an exterior reflected color characterized by an $a_h$ color coordinate of between −3 and 1, and a $b_h$ color coordinate of between −5 and 0. As just one example, the exemplary film stack tabulated below achieves such properties (together with the exceptional combination of properties described in the preceding paragraphs) when incorporated into the present laminated glass assembly 33 comprising the panes 12, 12' and interlayer 16 specified above.

The foregoing discussion of color properties is reported using the well known color coordinates of "a" and "b." In particular, these color coordinates are indicated herein using the subscript h (i.e., $a_h$ and $b_h$) to represent the conventional use of the well known Hunter Lab Color System (Hunter methods/units, Ill. D65, 10 degree observer). Such color properties can be determined as specified in ASTM Method E 308, the entire teachings of which are incorporated herein by reference.

The properties reported herein can be achieved when using clear glass for the (or each) pane. Thus, for any embodiment (e.g., any combination of properties noted herein), the (or each) pane can be clear glass, such as clear soda-lime float glass. The invention, however, is not so limited. For example, tinted glass may be used. Glass types other than soda-lime can also be used. Moreover, panes comprising certain polymers may be suitable in some cases. Furthermore, low-E coated glass can optionally be used for both panes 12, 12'.

Further, the property ranges reported herein are not limiting to the invention. For example, it may be desirable for some applications to provide lower levels of visible transmittance, or different color properties, than those noted above. In such cases, the film stack, panes, and/or interlayer can be changed to achieve the desired optical properties. The same is true of the other properties and ranges mentioned in this disclosure.

Figure 2:
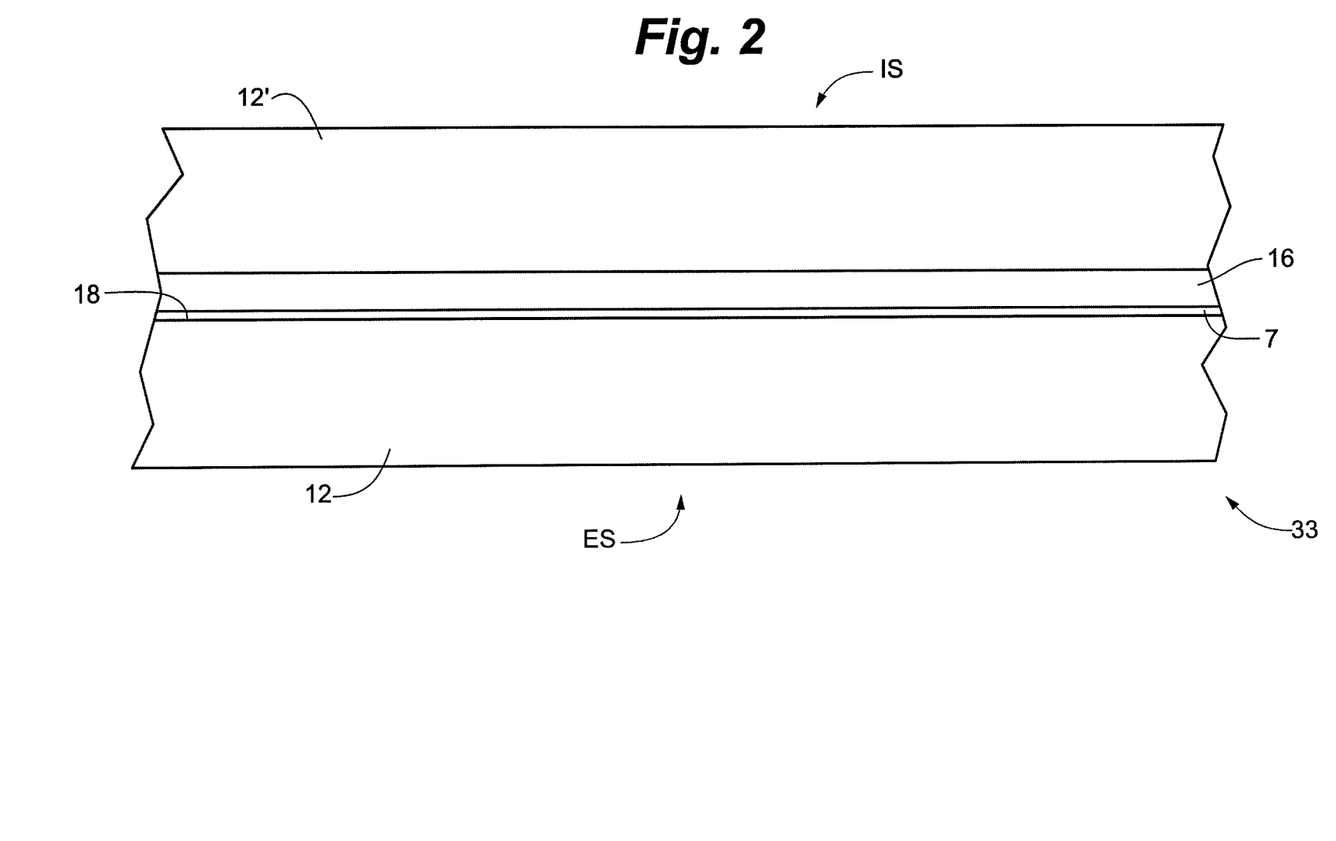
FIG. 2 is a schematic, broken-away cross-sectional view of a laminated glass assembly that includes a low solar transmittance coating in accordance with certain embodiments of the invention.
Figure 4:
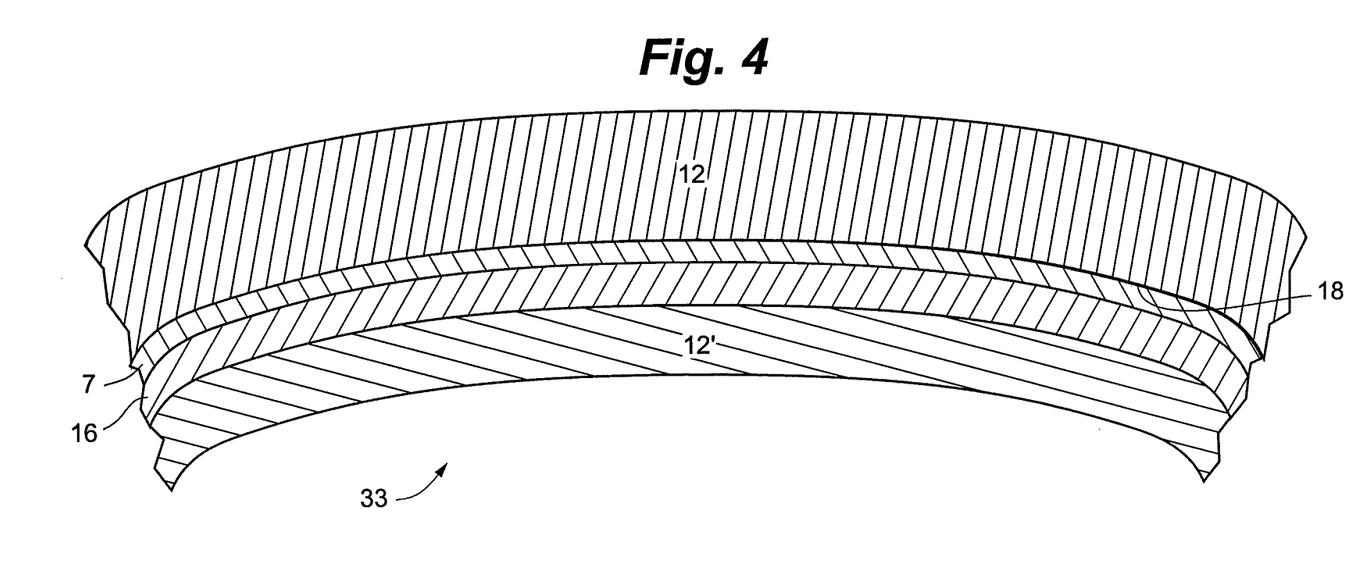
FIG. 4 is a schematic, broken-away cross-sectional view of a bent laminated glass assembly that includes a low solar transmittance coating in accordance with certain embodiments of the invention.
Figure 5:
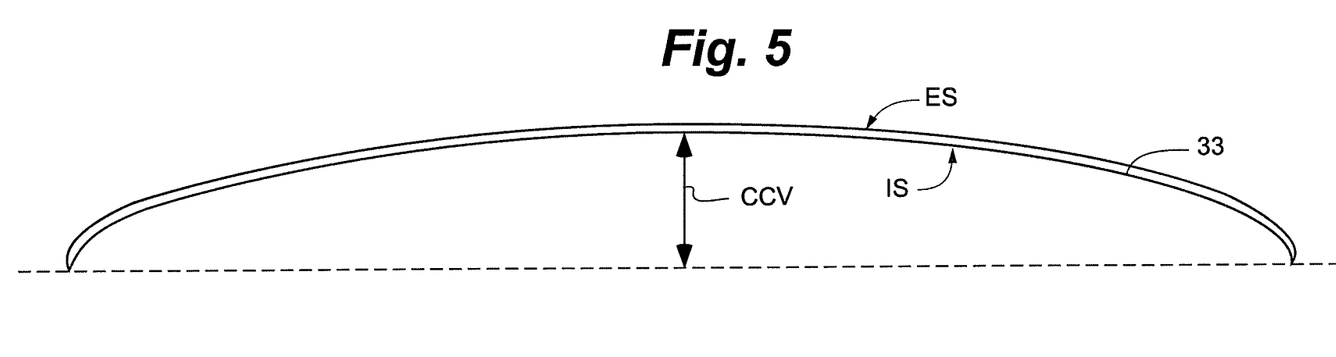
FIG. 5 is a schematic side view of a bent laminated glass assembly that includes a low solar transmittance coating in accordance with certain embodiments of the invention, wherein a centerline convex value of the bent laminated glass assembly is shown.

As noted above, the laminated glass assembly for which the foregoing properties are reported is a heat-bent laminated glass assembly. Thus, in certain embodiments, the panes 12, 12' are both heat-bent glass, and the low solar transmittance coating 7 is a heat-bent coating. Accordingly, in certain embodiments, the laminated glass assembly 33 is a bent automobile windshield or another type of bent (or "non-planar") laminated glass assembly, such as a curved skylight. Reference is made to FIGS. 4 and 5. In other embodiments, the laminated glass assembly 33 is planar. Reference is made to FIG. 2.

As is well known, in producing bent laminated glass, the panes 12, 12' (as well as the coating 7) are heat-bent. Common bending operations involve heat treating the glass panes and allowing them to sag or be pressed in a known manner (e.g., into a bending mold). This heat treatment normally involves applying (e.g., heating the panes to) temperatures of at least 580° C., and often at least 620° C., for at least 4-10 minutes. When the term "heat-bent" is used herein to refer to the laminated glass panel 33 (or to one or both panes 12, 12', and/or to the coating 7), this means it has been heated (to a temperature sufficient to allow its controlled thermal bending) and bent. Typically, it will have been heated to temperatures of at least 580° C., and often at least 620° C., for at least 4-10 minutes.

In such embodiments, the low solar transmittance coating 7 retains coating integrity throughout the heat treatment. By "retains coating integrity," we mean the coating 7 does not experience a heat treatment failure during the heat treatment, e.g., the infrared-reflective (e.g., silver) film does not change from a continuous layer to a series of non-continuous islands, the infrared-reflective film (e.g., when formed of silver or another metal) does not become substantially oxidized so as to lose substantial conductivity, etc. In such embodiments, the present coating 7 is durable to heat-bending, e.g., of the nature described above. For example, the film stack of the coating 7 in these embodiments preferably includes blocker film regions 105, 205, 305 that each have a thickness of at least about 20 Å, such as 25 Å or more. In some cases, the combined physical thickness of these three blocker film regions 105, 205, 305 is greater than 75 Å, or even greater than 80 Å, such as about 85 Å. In addition, an optional first layer comprising silica (such as the one provided in the exemplary film stack tabulated below) can advantageously be used in such heat-bendable coating embodiments. Moreover, the infrared-reflection film regions 100, 200, 300 in heat-bendable coating embodiments preferably are thick enough that none of them change from a continuous layer to a series of non-continuous islands. While the thicknesses required to provide such performance will depend upon the particulars of the heat treatment to be performed, in certain heat-treatable coating embodiments, each infrared-reflection film region 100, 200, 300 is thicker than about 70-80 Å, and perhaps optimally thicker than 100 Å, such as 105 Å or more.

When performed, heat bending can be done in any conventional manner. Typically, the two panes 12, 12' will be flat soda-lime glass, and the interior surface of one of the panes will bear the coating 7. In one method, the two flat panes are placed on a bending mold in a bending furnace (optionally with a conventional lubricating powder between them) and then heated in the furnace to a temperature near the softening point of the glass (commonly from 550 to 775° C., depending on the particular glass type and curvature needed). The glass panes then sag under their own weight and bend down into the shape of the mold. A conventional press bending step may optionally be used after the glass is softened. The resulting bent glass panes are then separated, and the interlayer 16 is positioned between them (with the coating 7 adjacent to the interlayer) to form a sandwich. The sandwich is then placed in an autoclave and processed (as described below) so as to laminate the two panes 12, 12' together via interlayer 16.

With reference to FIG. 5, for embodiments where the laminated glass assembly 33 is bent, the panel 33 can be characterized by specifying a centerline convex value CCV, which is the perpendicular distance between the apex of the panel's interior surface IS to a line connecting the two side ends of the panel. This value reflects the extent to which the panel 33 is bent. In some embodiments, the panel 33 has a centerline convex value CCV of greater than zero, greater than 5 mm, or greater than 10 mm. Additionally or alternatively, the centerline convex value CCV can optionally be less than 36 mm, less than 30 mm, or less than 20 mm. The centerline convex value CCV will, of course, vary depending upon the particular shape desired for the panel 33.

Figure 1:
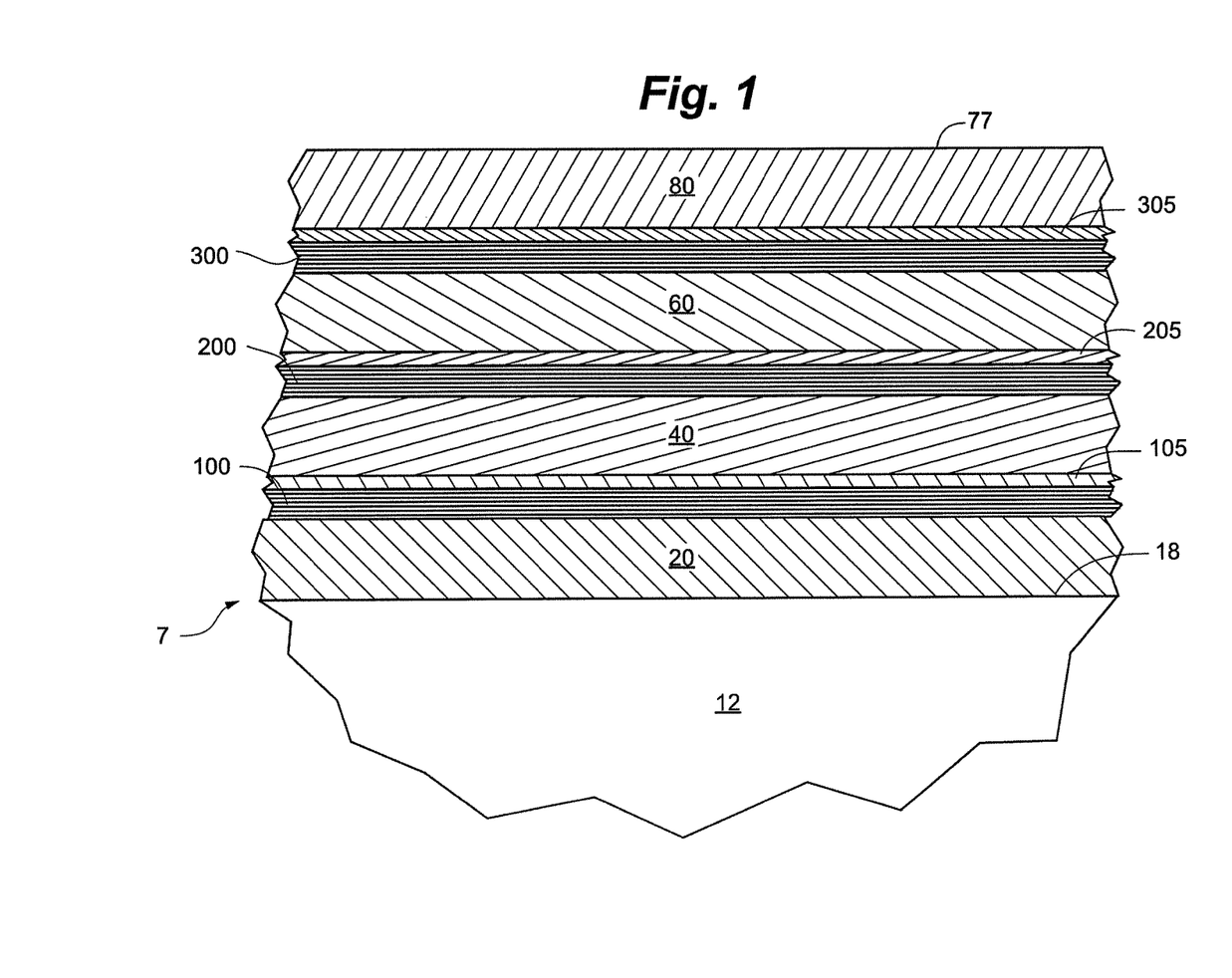
FIG. 1 is a schematic, broken-away cross-sectional view of a substrate bearing a low solar transmittance coating in accordance with certain embodiments of the invention.

FIG. 1 exemplifies certain embodiments that provide a coated substrate 12 (e.g., glass, such as soda-lime float glass, plastic, or another transparent substrate) having a major surface 18 bearing the present low solar transmittance coating 7. Generally, the coating includes, in sequence from the major surface 18 outwardly, a first transparent dielectric film region 20, a first infrared-reflection film region 100, a second transparent dielectric film region 40, a second infrared-reflection film region 200, a third transparent dielectric film region 60, a third infrared-reflection film region 300, and a fourth transparent dielectric film region 80. In FIG. 1, optional blocker film regions 105, 205, 305 are shown, although these are not required in all embodiments.

Each infrared-reflection film region 100, 200, 300 can advantageously comprise (optionally at least 50 atomic percent of, in some cases consisting essentially of) silver. Further, in some embodiments, the thickness of at least one of the infrared-reflection film regions 100, 200, 300 is greater than 120 Å, greater than 135 Å, or even greater than 140 Å. Additionally or alternatively, the first, second, and third infrared-reflection film regions can optionally have a combined thickness of between 310 Å and 475 Å, such as about 400 Å. In some cases, the first, second, and third infrared-reflection film regions are silver layers having respective thicknesses of about 115 Å, 145 Å, and 135 Å. Absent an indication to the contrary, all thicknesses mentioned in this disclosure are physical thicknesses, rather than optical thicknesses.

One group of embodiments provides a coated substrate (e.g., a coated pane, such as a glass pane, optionally having a major dimension of at least 1 meter, or at least 1.2 meters) bearing a low solar transmittance coating 7 that comprises three infrared-reflection film regions 100, 200, 300 having a combined thickness of between 310 Å and 475 Å. This range has been found to be particularly useful for providing low solar transmittance in combination with high visible transmittance, as discussed above.

The infrared-reflection film regions 100, 200, 300 are described below in further detail. Briefly, though, some preferred embodiments provide these film regions in the form of silver layers each consisting essentially of silver, with these three layers optionally being the only silver layers in the coating.

The first transparent dielectric film region 20 is applied over (in some cases, directly over) a major surface 18 of the substrate 12. This film region 20 can be of any composition that includes at least some (or, optionally, consists essentially of) transparent dielectric film. In some cases, the first transparent dielectric film region 20 is a single layer. In other cases, it comprises a plurality of layers. As described in U.S. Pat. No. 5,296,302 (the teachings of which on useful dielectric materials are incorporated herein by reference), useful dielectric film materials for this purpose include oxides of zinc, tin, indium, bismuth, titanium, hafnium, zirconium, and alloys thereof. Film comprising silicon oxide, silicon nitride, or silicon oxynitride can also be used.

The first transparent dielectric film region 20 can be a single layer of a single dielectric material. If a single layer is used, it is generally preferred that this inner dielectric layer be formed of a mixture of zinc oxide and tin oxide (referred to herein as "zinc tin oxide" or, e.g., in Table 1 below, as "Zn+O"). It should be understood, though, that such a single layer can be replaced with two or more layers of different dielectric materials. For example, it may be advantageous to provide a first layer comprising silicon dioxide and a second layer comprising zinc tin oxide. In certain embodiments, the first transparent dielectric film region 20 comprises a graded thickness of film, having a composition that changes (e.g., in a gradual manner) with increasing distance from the substrate 12.

In some embodiments, the first transparent dielectric film region 20 comprises film (optionally comprising zinc oxide, such as a zinc tin oxide) having a refractive index of 1.7 or greater. For example, between the first infrared-reflection film region 100 and the surface 18 of the substrate 12, there can be provided a desired total thickness (i.e., total physical thickness) of film that has a refractive index of 1.7 or greater. In some cases, this desired total thickness is less than 190 angstroms, less than 175 angstroms, less than 150 angstroms, less than 135 angstroms, or even less than 130 angstroms. In other cases, though, there may be a much greater thickness of high refractive index film between the substrate 12 and the first infrared-reflection film region 100.

Referring again to FIG. 1, the first infrared-reflection film region is identified by the reference number 100. This film region 100 preferably is contiguous to, i.e., in direct physical contact with, the outer face of the first transparent dielectric film region 20. Any suitable infrared reflection material can be used. Silver, gold, and copper, as well as alloys thereof, are the most commonly used infrared-reflection film materials. However, conductive nitride films or highly conductive semiconductors may also be used. Preferably, the infrared-reflection film consists essentially of silver or silver combined with no more than about 5% of another metal, such as another metal selected from the group consisting of gold, platinum, and palladium. In other cases, one or more of the infrared-reflection film regions comprise silver combined with titanium, tin, or niobium.

When desired for protection of the infrared-reflection film during application of subsequent film and/or during any heat treatment (e.g., tempering), a first blocker film region 105 can optionally be provided over and contiguous to the first infrared-reflection film region 100. This blocker film region 105 can be provided to protect the underlying infrared-reflection film region 100 from chemical attack. In such cases, any material that is, for example, readily oxidized may be useful. In certain embodiments, a thin layer of titanium metal is applied, and in some cases (e.g., cases where oxide film is reactively deposited directly over such a blocker film region) at least an outermost thickness of that titanium metal is converted to titanium oxide of varying stoichiometry during deposition of overlying film. In another embodiment, the blocker film region 105 is deposited as a layer of niobium. Useful blocker layers comprising niobium are discussed in detail in PCT International Publication No. WO 97/48649. The teachings of this PCT Publication relating to blocker layers are incorporated herein by reference. Other materials can be used, such as zinc, nickel, chromium, nickel-chrome, etc.

Exemplary thicknesses for the optional blocker film region generally range from 10-35 Å, such as 10-30 Å. Greater thicknesses can be used, if desired.

In one group of embodiments, the coating 7 comprises three infrared-reflection film regions directly over at least one of which (and optionally over each of which) there is provided a blocker film region that is deposited in a non-metallic form (e.g., as a non-metallic material selected from the group consisting of an oxide, a nitride, and an oxynitride, including substoichiometric forms thereof). In this group of embodiments, the thickness for each such blocker film region can be within any one of the ranges noted herein for the optional blocker film regions. Related method embodiments involve sequentially depositing the film regions of any coating embodiment disclosed herein, and in the process, depositing one or more blocker film regions in non-metallic form.

While not shown in FIG. 1, a blocker film region can optionally be provided under the first infrared-reflection film region 100 as well. Upper and lower blocker film regions (when provided) need not be made of the same material, and could be sub-oxides, sub-nitrides, or oxynitrides. When provided, lower blocker film regions could be used to provide stress-free adhesion between dielectric and metal (e.g., silver) films and/or to serve as seed layers for providing optimal growth conditions for the metal film.

The second transparent dielectric film region 40 is positioned between the first infrared-reflection film region 100 and the second infrared-reflection film region 200. Thus, the film region 40 can also be referred to as a "spacer" film region. This first spacer film region 40 can be a single layer of a single transparent dielectric material, or it can be a plurality of layers of different transparent dielectric materials. In some cases, the second transparent dielectric film region 40 comprises at least two, or at least three transparent dielectric layers. Optionally, there are at least four, at least five, or even at least seven, such layers. As an alternative to using one or more discrete layers, part or all of the second transparent dielectric film region 40 can have a graded composition (optionally characterized by a gradual transition from one transparent dielectric material to another with increasing distance from the substrate). In certain preferred embodiments, the film region 40 consists essentially (or consists) of a single layer of zinc tin oxide.

The next illustrated film region is the second infrared-reflection film region 200. This film region 200 preferably is contiguous to the outer face of the second transparent dielectric film region 40. Any suitable infrared reflection material can be used, such as silver, gold, and copper, or alloys including one or more of these metals. The infrared reflection material can be, for example, a metal, an electrically conductive nitride, or a highly conductive semiconductor. In some particular embodiments, the infrared-reflection film consists essentially of silver or silver combined with no more than about 5% of another metal, such as another metal selected from the group consisting of gold, platinum, and palladium. In other cases, the infrared-reflection film comprises silver combined with titanium, tin, or niobium.

When desired for protection of the second infrared-reflection film region 200, a second blocker film region 205 can optionally be provided over and contiguous to the second infrared-reflection film region 200. This blocker film region 205 can comprise any material that is, for example, readily oxidized. In certain embodiments, a thin layer of titanium metal is applied, and in some cases (e.g., cases where oxide film is reactively deposited directly over this blocker film region 205) at least an outermost thickness of that titanium metal is converted to a titanium oxide of varying stoichiometry during deposition of overlying film. In another embodiment, the blocker film region 205 is deposited as a layer of niobium or one of the noted non-metallic blocker film materials. Other materials can be used, such as nickel, chromium, nickel-chrome, etc.

Suitable thicknesses for the optional second blocker film region 205 generally range from 10-35 Å, or 10-30 Å. Greater thicknesses can be used, if desired. While not shown in FIG. 1, a blocker film region can optionally be provided under the second infrared-reflection film region 200 as well.

The third transparent dielectric film region 60 is positioned between the second infrared-reflection film region 200 and the third infrared-reflection film region 300. This transparent dielectric film region 60 is also a spacer film region, and can be referred to as the second spacer film region. The third transparent dielectric film region 60 can be a single layer of a single transparent dielectric material, or it can be a plurality of layers of different transparent dielectric materials. In some cases, the third transparent dielectric film region 60 comprises at least two, or at least three, transparent dielectric layers. Optionally, there are at least five, or even at least seven, such layers. As an alternative to one or more discrete layers, part or all of the third transparent dielectric film region 60 can have a graded composition. In certain preferred embodiments, the film region 60 consists essentially (or consists) of a single layer of zinc tin oxide.

The next illustrated film region is the third infrared-reflection film region 300. This film region 300 preferably is contiguous to the outer face of the third transparent dielectric film region 60. Any suitable infrared reflection material can be used (e.g., silver, gold, copper, or an alloy comprising one or more of these metals). In some particular embodiments, the third infrared-reflection film region 300 consists essentially of silver or silver combined with no more than about 5% of another metal, such as another metal selected from the group consisting of gold, platinum, and palladium. In other cases, the infrared-reflection film comprises silver together with titanium, tin, or niobium.

When desired for protection of the third infrared-reflection film region 300, a third blocker film region 305 can optionally be provided over and contiguous to the third infrared-reflection film region 300. This blocker film region 305 can comprise any material that is, for example, readily oxidized. In certain embodiments, a thin layer of titanium metal is applied, and in some cases (e.g., cases where oxide film is reactively deposited directly over this blocker film region 305) at least an outermost thickness of that titanium metal is converted to a titanium oxide of varying stoichiometry during deposition of overlying film. In another embodiment, the blocker film region 305 is deposited as a layer of niobium or one of the noted non-metallic blocker film materials. Other materials can be used, such as nickel, chromium, nickel-chrome, etc.

Suitable thicknesses for the optional third blocker film region 305 generally range from 10-35 Å, or 10-30 Å. Greater thicknesses can be used, if desired. While not shown in FIG. 1, a blocker film region can optionally be provided under the third infrared-reflection film region 300 as well.

The fourth transparent dielectric film region 80 is located further from the substrate 12 than the third infrared-reflection film region 300. In some, though not all, embodiments, this film region 80 defines the coating's outermost face 77. The fourth transparent dielectric film region 80 can be a single layer of a single transparent dielectric material, or it can be a plurality of (i.e., two or more) layers of different transparent dielectric materials. In some cases, the fourth transparent dielectric film region 80 comprises at least three transparent dielectric layers. Optionally, there are at least four, at least five, or even at least seven, such layers. As an alternative to using one or more discrete layers, part or all of the fourth transparent dielectric film region 80 can have a graded composition. In certain preferred embodiments, the film region 80 consists essentially (or consists) of a first layer comprising zinc tin oxide, a second layer comprising silicon nitride, and an outermost layer comprising zinc tin oxide.

For purposes of making the coating durable to lamination, it may be advantageous to provide the fourth transparent dielectric film region 80 in the form of a dielectric film region comprising an outermost oxide layer over a nitride or oxynitride layer. In such cases, the outermost oxide layer can optionally have a thickness of less than 75 Å, less than 50 Å, less than 25 Å, or even less than 20 Å. The outermost oxide layer can, for example, comprise zinc tin oxide, and the underlying layer can comprise silicon nitride or silicon oxynitride. As noted above, in some preferred embodiments, the fourth dielectric film region 80 consists essentially (or consists) of a first layer comprising zinc tin oxide, a second layer comprising silicon nitride, and an outermost layer comprising zinc tin oxide.

Thus, it can be appreciated that the present coating 7 desirably includes at least four transparent dielectric film regions 20, 40, 60, 80. In some embodiments, the coating 7 comprises one or more, two or more, or even three or more nitride or oxynitride films, such as at least one, at least two, or even at least three films comprising silicon nitride and/or silicon oxynitride. In some embodiments of this nature, the coating 7 includes at least one nitride or oxynitride film (optionally comprising silicon nitride or silicon oxynitride) having a thickness of less than 150 angstroms, less than 140 angstroms, or even less than 125 angstroms, together with at least one other nitride or oxynitride film (optionally comprising silicon nitride or silicon oxynitride) having a thickness of greater than 50 angstroms, greater than 75 angstroms, greater than 100 angstroms, greater than 150 angstroms, or even greater than 175 angstroms. In some cases, the latter noted film is located either between the first 100 and second 200 infrared-reflection film regions or between the second 200 and third 300 infrared-reflection film regions. That is, it forms (or is part of) one of the spacer film regions. In other cases, the first 20, second 40, and third 60 transparent dielectric film regions consist essentially of (or consist of) oxide film.

The total thickness of the present coating 7 can be varied to suit the requirements of different applications. In certain preferred embodiments, the total physical thickness of the coating 7 is greater than 1,750 angstroms, greater than 1,800 angstroms, greater than 1,900 angstroms, or even greater than 2,000 angstroms. For any embodiment disclosed in this specification, the coating's total thickness can optionally fall within any one or more of the ranges specified in this paragraph.

In one preferred group of embodiments, the third infrared-reflection film region 300 is thinner (optionally by more than 5 Å, or by at least 10 Å) than the second infrared-reflection film region 200. In these embodiments, the first infrared-reflection film region 100 may be thinner (optionally by more than 10 Å, by more than 20 Å, or by at least 25 Å) than the second infrared-reflection film region 200. The present group of embodiments (which involves thinning the third infrared-reflection film region) is believed to be particularly advantageous in reducing the magnitude of the visible transmission drop that occurs during lamination. In some particularly preferred embodiments, these relative thicknesses are provided together with having the combined thickness of the three IR film regions be greater than 300 Å, such as between 310 Å and 475 Å.

For purposes of the present specification, the first reflection-region ratio is defined as the thickness of the first infrared-reflection film region 100 divided by the thickness of the second infrared-reflection film region 200, and the second reflection-region ratio is defined as being the thickness of the second infrared-reflection film region 200 divided by the thickness of the third infrared-reflection film region 300. In some embodiments, the first reflection-region ratio is less than 0.85, less than 0.83, less than 0.80, or even less than 0.79, while the second reflection-region ratio is greater than 1. In certain preferred embodiments, these ratios are provided together with having the combined thickness of the three IR film regions be greater than 300 Å, such as between 310 Å and 475 Å.

In some embodiments of the present group, the thickness of at least one of the infrared-reflection film regions 100, 200, 300 is greater than 130 Å (or greater than 140 Å) while the thickness of at least one of the other infrared-reflection film regions is less than 125 Å (or less than 120 Å). Additionally or alternatively, the first, second, and third infrared-reflection film regions can optionally have a combined thickness of between 310 Å and 475 Å, such as about 400 Å. Further, the reflection-region ratios noted in the preceding paragraph can be used. In some cases, the first, second, and third infrared-reflection film regions 100, 200, 300 are silver layers having respective thicknesses of 115 Å, 145 Å, and 135 Å.

In some embodiments of the present group, the first transparent dielectric film region 20 comprises film (optionally comprising zinc oxide, such as a zinc tin oxide) having a refractive index of 1.7 or greater. For example, between the first infrared-reflection film region 100 and the surface 18 of the substrate 12, there can advantageously be provided a desired total thickness (i.e., total physical thickness) of film that has a refractive index of 1.7 or greater. In certain embodiments, this desired total thickness is less than 190 angstroms, less than 175 angstroms, less than 165 angstroms, less than 140 angstroms, or even less than 130 angstroms. This, however, is by no means required. For example, the first transparent dielectric film region 20 may have far more high index film (e.g., 200-300 Å or more) in many cases.

For purposes of this disclosure, the first dielectric-region ratio is defined as the optical thickness of the first transparent dielectric film region 20 (i.e., the total optical thickness of all the transparent dielectric films/layers of this film region 20) divided by the optical thickness of the fourth transparent dielectric film region 80 (i.e., the total optical thickness of all the transparent dielectric films/layers of this film region 80; not counting any sacrificial layer that may be provided directly over the third infrared-reflection film region 300). This ratio can advantageously be less than 0.75, or even less than 0.73, while at the same time optionally being greater than 0.34, greater than 0.35, greater than 0.37, or even greater than 0.40. In one exemplary embodiment, this ratio is about 0.69. A primary dielectric-region ratio within any one or more of these ranges can optionally be provided in any embodiment of the present group, or for any other embodiment disclosed in this specification.

Table 1 below shows one exemplary film stack that can be used advantageously as the low solar transmittance coating 7:

TABLE 1

| FILM | SAMPLE A |
| --- | --- |
| SiO2 | 95 Å |
| Zn + O | 125 Å |
| Ag | 115 Å |
| Ti | 25 Å |
| Zn + O | 590 Å |
| Ag | 145 Å |
| Ti | 30 Å |
| Zn + O | 610 Å |
| Ag | 135 Å |
| Ti | 30 Å |
| Zn + O | 115 Å |
| Si3N4 | 175 Å |
| Zn + O | 10 Å |

The present invention includes methods of producing a coated substrate, e.g., a coated glass pane. The invention provides method embodiments wherein the film regions of any coating embodiment disclosed herein are sequentially deposited using any one or more thin film deposition techniques. In accordance with the present methods, a substrate 12 having a surface 18 is provided. If desired, this surface 18 can be prepared by suitable washing or chemical preparation. The present coating 7 is deposited on the surface 18 of the substrate 12, e.g., as a series of discrete layers, as a thickness of graded film, or as a combination including at least one discrete layer and at least one thickness of graded film. The coating can be deposited using any suitable thin film deposition technique. One preferred method utilizes DC magnetron sputtering, which is commonly used in industry. Reference is made to Chapin's U.S. Pat. No. 4,166,018, the teachings of which are incorporated herein by reference.

Briefly, magnetron sputtering involves transporting a substrate through a series of low pressure zones (or "chambers" or "bays") in which the various film regions that make up the coating are sequentially applied. Metallic film is sputtered from metallic sources or "targets," typically in an inert atmosphere such as argon. To deposit transparent dielectric film, the target may be formed of the dielectric itself (e.g., zinc oxide or titanium oxide). More commonly, though, the dielectric film is applied by sputtering a metal target in a reactive atmosphere. To deposit zinc oxide, for example, a zinc target can be sputtered in an oxidizing atmosphere; silicon nitride can be deposited by sputtering a silicon target (which may be doped with aluminum or the like to improve conductivity) in a reactive atmosphere containing nitrogen gas. The thickness of the deposited film can be controlled by varying the speed of the substrate and/or by varying the power on the targets.

Another method for depositing thin film on a substrate involves plasma chemical vapor deposition. Reference is made to U.S. Pat. No. 4,619,729 (Johncock et al.) and U.S. Pat. No. 4,737,379 (Hudgens et al.), the teachings of both of which are incorporated herein by reference. Such plasma chemical vapor deposition involves the decomposition of gaseous sources via a plasma and subsequent film formation onto solid surfaces, such as glass substrates. The film thickness can be adjusted by varying the speed of the substrate as it passes through a plasma zone and/or by varying the power and/or gas flow rate within each zone.

One exemplary, non-limiting method will now be described for depositing a low solar transmittance coating 7 in accordance with certain embodiments of the invention. A sputtering line (or "coater") is used to deposit the coating 7, which in this example includes, in sequence from the major surface 18 outwardly, a first transparent dielectric film region 20 comprising a first silica layer and a second zinc tin oxide layer, a first infrared-reflection film region 100 comprising silver, a first blocker film region 105 comprising titanium, a second transparent dielectric film region 40 comprising zinc tin oxide, a second infrared-reflection film region 200 comprising silver, a second blocker film region 205 comprising titanium, a third transparent dielectric film region 60 comprising zinc tin oxide, a third infrared-reflection film region 300 comprising silver, a third blocker film region 305 comprising titanium, and a fourth transparent dielectric film region 80 comprising a first layer formed of zinc tin oxide, a second layer formed of silicon nitride, and a third, outermost layer formed of zinc tin oxide.

The substrate 12 is positioned at the beginning of the coater and conveyed into the first coat zone (e.g., by conveying the substrate along transport rollers). This coat zone is provided with three sputtering bays (or "positions"), which are adapted collectively to deposit the silica layer. Each position is provided with a sputtering target comprising a compound of silicon together with a small amount of aluminum. In this coat zone, each position has a single cylindrical sputtering target, although the number and type (e.g., cylindrical versus planar) can be varied as desired. These first three targets are sputtered in an oxidizing atmosphere to deposit the silica layer directly on the substrate. The oxidizing atmosphere here can comprise argon and oxygen at a pressure of about 4.5 mbars. Alternatively, this atmosphere may consist essentially of oxygen (e.g., about 100% $O_2$). A power of about 86 kW is applied to the first target, a power of about 79.3 kW is applied to the second target, and a power of about 74.4 kW is applied to the third target. The substrate is conveyed beneath these targets at a rate of about 275 inches per minute, while sputtering each target at the noted power level, thereby depositing the silica layer at a thickness of about 95 angstroms.

Next, the substrate is conveyed into a second coat zone having two active positions. Each of these active positions is provided with a sputtering target comprising a compound of zinc and tin. Each position in this coat zone has a single cylindrical sputtering target, although again the number and type (e.g., cylindrical versus planar) can be varied as desired. These two active targets are sputtered in an oxidizing atmosphere to deposit the zinc tin oxide layer of the first transparent dielectric film region 20. The oxidizing atmosphere here can comprise argon and oxygen at a pressure of about 3.5 mbars. Alternatively, this atmosphere may consist essentially of oxygen (e.g., about 100% $O_2$). A power of about 54.7 kW is applied to the first target, and a power of about 61.0 kW is applied to the second target. The substrate is conveyed beneath these targets at a rate of about 275 inches per minute, while sputtering each target at the noted power level, thereby depositing the zinc tin oxide layer of the first transparent dielectric film region 20 at a thickness of about 125 angstroms.

The substrate is then conveyed into a third coat zone wherein the first infrared-reflection film region 100 is applied directly over the first transparent dielectric film region 20. The third coat zone is provided with an inert atmosphere (e.g., argon at a pressure of about 5 mbars). The two active positions of this coat zone each have a planar target, although the number and type of targets can be changed. The target in the first active position is a metallic silver target, and the target in the second active position is a metallic titanium target. The substrate is conveyed beneath the silver target at a rate of about 275 inches per minute, while sputtering this target at a power of about 8.2 kW, thereby depositing the first infrared-reflection film region 20 in the form of a silver film having a thickness of about 115 angstroms. The substrate is then conveyed beneath the titanium target, while sputtering this target at a power of about 10.7 kW, thereby depositing a first blocker film region 105 in the form of a film comprising titanium and having a thickness of about 25 angstroms.

The substrate is then conveyed through a fourth coat zone, a fifth coat zone, and a sixth coat zone, in which zones the second transparent dielectric film region 40 is applied in the form of an oxide film comprising zinc and tin. These coat zones each have three active sputtering positions. In each of these positions, there is a cylindrical target comprising (i.e., including a sputterable target material comprising) a compound of zinc and tin. Each of these sputtering positions is provided with an oxidizing atmosphere. The oxidizing atmosphere in the fourth, fifth, and sixth coat zones can each comprise argon and oxygen at a pressure of about 3.5 mbars. Alternatively, the atmosphere may consist essentially of oxygen (e.g., about 100% $O_2$).

A power of about 68.1 kW is applied to the first target in the fourth coat zone, a power of about 72.3 kW is applied to the second target in this coat zone, and a power of about 38.5 kW is applied to the third target in this zone. A power of about 62.2 kW is applied to the first target in the fifth coat zone, a power of about 62.1 kW is applied to the second target in this coat zone, and a power of about 62.6 is applied to the third target in this zone. Further, a power of about 67.8 kW is applied to the first target in the sixth coat zone, a power of about 43.8 kW is applied to the second target in this coat zone, and a power of about 63.9 kW is applied to the third target in this zone. The substrate 12 is conveyed beneath the targets in coat zones 4-6, while conveying the substrate at a rate of about 275 inches per minute and sputtering the targets at the noted power levels, such that the second transparent dielectric film region 40 is applied in the form of an oxide film comprising zinc and tin and having a thickness of about 590 angstroms.

The substrate is then conveyed into a seventh coat zone wherein the second infrared-reflection film region 200 is applied directly over the second transparent dielectric film region 40. The seventh coat zone has an inert atmosphere (e.g., argon at a pressure of about 5 mbars). The two active sputtering positions of this coat zone each have a planar target. The target in the first active position is a metallic silver target, and the target in the second active position is a metallic titanium target. A power of about 10.4 kW is applied to the silver target, while the substrate is conveyed beneath this target at a rate of about 275 inches per minute, to deposit the second infrared-reflection film region 200 as a metallic silver film having a thickness of about 145 angstroms. The substrate is then conveyed (at the same line speed) beneath the metallic titanium target in the next active position, with a power of about 12.9 kW being applied to this target, to deposit a second blocker film region 205 comprising titanium and having a thickness of about 30 angstroms.

The substrate is then conveyed through an eighth coat zone, a ninth coat zone, and a tenth coat zone, wherein collectively the third transparent dielectric film region 60 is applied. Each of these coat zones has three active sputtering positions, and each such position is provided with a cylindrical target. The targets here all comprise a sputterable material that is a compound of zinc and tin. Each of these coat zones is provided with an oxidizing atmosphere comprising argon and oxygen at a pressure of about 3.5 mbars. Alternatively, the atmosphere may consist essentially of oxygen (e.g., about 100% $O_2$).

A power of about 70.6 kW is applied to the first target in the eighth coat zone, a power of about 75.3 kW is applied to the second target in this coat zone, and a power of about 60.0 kW is applied to the third target in this zone. A power of about 62.4 kW is applied to the first target in the ninth coat zone, while a power of about 61.1 kW is applied to the second target in this coat zone, and a power of about 66.3 kW is applied to the third target in this zone. A power of about 64.6 kW is applied to the first target in the tenth coat zone, while a power of about 35.9 kW is applied to the second target in this coat zone, and a power of about 65.1 kW is applied to the third target in this zone. The substrate is conveyed beneath these targets at a rate of about 275 inches per minute, while sputtering the targets at the noted power levels, such that the third transparent dielectric film region 60 is applied as an oxide film comprising zinc and tin and having a thickness of about 610 angstroms.

The substrate is then conveyed into an eleventh coat zone wherein the third infrared-reflection film region 300 is applied. This coat zone contains an inert atmosphere (e.g., argon at a pressure of about 5 mbars). The two active positions in this coat zone are each provided with a planar target. The target in the first active position is a metallic silver target, and the target in the second active position is a metallic titanium target. A power of about 9.6 kW is applied to the silver target, while the substrate is conveyed beneath this target at a rate of about 275 inches per minute, thereby depositing the third infrared-reflection film region 300 as a silver film having a thickness of about 135 angstroms. The substrate is then conveyed (at the same line speed) beneath the titanium target, while sputtering that target at a power level of about 12.9 kW, so as to deposit a third blocker film region 305 in the form of a film comprising titanium and having a thickness of about 30 angstroms.

The substrate is then conveyed through a twelfth coat zone, a thirteenth coat zone, and a fourteenth coat zone, wherein collectively there is deposited an inner portion of the fourth transparent dielectric film region 80. The twelfth coat zone has three sputtering positions, each equipped with a cylindrical target. Each of these targets comprises a sputterable target material that is a compound of zinc and tin. This coat zone is provided with an oxidizing atmosphere consisting essentially of oxygen (e.g., about 100% $O_2$) at a pressure of about 3.5 mbars. Alternatively, this atmosphere can comprise argon and oxygen. The thirteenth coat zone has three active sputtering positions, and each of these positions is equipped with a cylindrical target. Each of these targets comprises a sputterable target material formed of silicon together with a small amount of aluminum. This coat zone is provided with an atmosphere essentially of nitrogen (e.g., about 100% $N_2$) at a pressure of about 4 mbars. Alternatively, this atmosphere can comprise nitrogen and argon. The fourteenth coat zone has three active sputtering positions, each equipped with a cylindrical silicon target of the nature mentioned. This coat zone is provided with nitriding atmosphere consisting essentially of nitrogen (e.g., about 100% $N_2$) at a pressure of about 4 mbars. Alternatively, this atmosphere can comprise nitrogen and argon.

A power of about 47.7 kW is applied to the first target in the twelfth coat zone, a power of about 27.9 kW is applied to the second target in this coat zone, and a power of about 31 kW is applied to the third target in this zone. A power of about 21.1 kW is applied to the first target in the thirteenth coat zone, a power of about 18.2 kW is applied to the second target in this coat zone, and a power of about 17.8 kW is applied to the third target in this zone. Finally, a power of about 40.3 kW is applied to the first target in the fourteenth coat zone, a power of about 42 kW is applied to the second target in this coat zone, and a power of about 53.4 kW is applied to the third target in this zone. The substrate is conveyed beneath all of the noted targets at a rate of about 275 inches per minute, while sputtering these targets at the noted power levels, such that an inner portion of the fourth transparent dielectric film region 80 is applied as a first oxide film comprising zinc and tin and having at a thickness of about 115 angstroms, over which there is a silicon nitride film having a thickness of about 175 angstroms.

The substrate is then conveyed through a fifteenth coat zone. There is only one active sputtering position in the fifteenth coat zone, and that position is equipped with a cylindrical target comprising a sputterable target material that is a compound of zinc and tin. This coat zone is provided with an oxidizing atmosphere consisting essentially of oxygen (e.g., about 100% $O_2$) at a pressure of about 3.5 mbars. Alternatively, this atmosphere can comprise oxygen and argon. A power of about 7.1 kW is applied to the target in the active bay of the fifteenth coat zone. The substrate is conveyed beneath this target at a rate of about 275 inches per minute, while sputtering it at the noted power level, such that an outermost portion of the fourth transparent dielectric film region 80 is applied as an oxide film comprising zinc and tin and having a thickness of about 10 angstroms.

As noted above, one group of embodiments provides a laminated glass assembly that incorporates the low solar transmittance coating 7. The laminated glass assembly 33 includes two panes 12, 12' and an interlayer 16. Two exemplary embodiments are shown in FIGS. 2 and 4. As shown in FIGS. 2 and 4, each of the two illustrated panes 12, 12' has an uncoated, exposed outer side IS, ES surface. Here, the outboard pane 12 bears the low solar transmittance coating 7 on its inside surface 18, such that the coating is on the #2 surface of the assembly (i.e., the illustrated coating is sandwiched between the outboard pane and the interlayer). The coating can alternatively be provided on the #3 surface. Thus, at least one of the panes 12, 12' has a major surface bearing the coating 7 (e.g., such that the interlayer 16 is carried against the coating).

In some cases, the manufacture of the present laminated glass assembly 33 involves an autoclave operation. In the autoclave operation, the above-noted sandwich is placed in an autoclave and subjected to an elevated temperature (e.g., between about 200° F. and about 400° F., commonly between about 275° F. and about 300° F.) and an elevated atmospheric pressure (e.g., between about 100 psig and about 250 psig, commonly between about 150 psig and about 190 psig) until there is substantially complete adhesion of the interlayer to the glass and preferably substantially complete dissolution of air trapped within the interlayer. The autoclave operation may last approximately 2-4 hours. Conventional methods of producing laminated glass assemblies using an autoclave are well known in the present art, and are suitable for use in the present laminated glass assembly embodiments.

Thus, the present embodiments involve a laminated glass assembly (or "laminated glass panel") 33. As noted above, the panel 33 comprises an interlayer 16 sandwiched between two panes 12, 12'. Typically, the substrates 12, 12' are glass sheets. However, plastic and other types of substrates can also be used. Thus, although the terms "laminated glass assembly" and "laminated glass panel" are used herein, the panes in such a panel 33 can be formed of materials other than glass.

FIGS. 2 and 4 schematically illustrate the basic construction of the present laminated glass panel 33. The first pane 12 is bonded to the second pane 12' by an intermediate tear-resistant film (or "interlayer") 16, which will commonly comprise a polymer. In certain preferred embodiments, the first pane 12 initially has a thickness of about 2.2 mm, the second pane 12' initially has a thickness of about 2.2 mm, and the intermediate tear-resistant film 16 initially (i.e., before autoclaving and any bending) has a thickness of about 0.015 inch. In certain preferred embodiments, the interlayer is a sheet of polyvinylbutyral (PVB). Other embodiments use an interlayer of ionoplast plastic. Suitable ionoplast material is available commercially from Dupont (Wilmington, Del., U.S.A.), under the trade name Sentry Glas® Plus. In general, any desired interlayer material can be used. Other useful materials include urethane, silicone, etc.

When conventional triple-silver low solar transmittance coatings are used in producing laminated glass, there can be a substantial decrease in visible transmission upon lamination. For example, the Delta $T_{vis,\ lami}$ (the magnitude of the change in visible transmission that occurs as a result of the lamination operation) was found to be 7-8% when using one commercially available triple-silver coating. The Delta $T_{vis,\ lami}$ is determined by: 1) stacking the laminate sandwich and measuring its $T_{vis}$ after any heat-bend but before the lamination, ii) measuring the $T_{vis}$ after the lamination is completed, and iii) determining the magnitude of the drop in $T_{vis}$ from the value determined in step i above to the value determined in step ii above. An advantage of the present coating 7 is that it can facilitate a particularly low Delta $T_{vis,\ lami}$. For example, the coating 7 can be used in a laminated glass assembly to provide a Delta $T_{vis,\ lami}$ of less than 5%, such as about 3-4.5%, or no more than 4%, such as 3-4%. Moreover, the coating 7 can achieve such a low Delta $T_{vis,\ lami}$ even when its three infrared-reflection film regions 100, 200, 300 have a combined thickness of greater than 300 Å, such as between 310 Å and 475 Å.

Further, in some of the present laminated glass assembly embodiments, the three infrared-reflection film regions 100, 200, 300 have thicknesses that provide the resulting laminated glass assembly with a solar transmittance of less than 0.35 (e.g., less than 0.34, or even less than 0.32, such as 0.3 or less) and yet a visible transmittance of greater than 0.705 (e.g., greater than 0.7075, such as 0.71 or higher). This combination of properties can even be achieved with embodiments (including those using the film stack tabulated above) wherein the three infrared-reflection film regions 100, 200, 300 have a combined thickness of greater than 300 Å and yet the laminated glass assembly exhibits a small Delta $T_{vis,\ lami}$ (as quantified in the preceding paragraph). In these embodiments, the combined thickness of the three infrared-reflection film regions 100, 200, 300 can advantageously be greater than 300 Å in combination with the third infrared-reflection film region 300 being thinner (e.g., by at least 5 Å, such as by 10 Å or more) than the second infrared-reflection film region 200.

In some of the present embodiments, the combined thickness of the three infrared-reflection film regions 100, 200, 300 is greater than 325 Å, the solar transmittance of the laminated glass assembly is less than 0.32, and yet the visible transmittance of the assembly is greater than 0.705. Perhaps more preferably, the combined thickness of the three infrared-reflection film regions is greater than 350 Å and yet the visible transmittance of the laminated glass assembly is greater than 0.7075. And perhaps optimally, the combined thickness of the three infrared-reflection film regions is greater than 375 Å, the solar transmittance of the laminated glass assembly is less than 0.32, and yet the visible transmittance of the assembly is greater than 0.7075 (such as about 0.71 or more).

In laminated glass assemblies that are to achieve the foregoing combination of properties, the following advantageous guidelines can optionally be used. The thickness of the third infrared-reflection film region 300 is less than the thickness of the second infrared-reflection film region 200; the thickness of the first infrared-reflection film region 100 is less than the thickness of the third infrared-reflection film region 300; the thickness of the first infrared-reflection film region 100 is from 85 to 140 Å, while the thickness of the second infrared-reflection film region 200 is from 120 to 180 Å, and the thickness of the third infrared-reflection film region 300 is from 110 to 170 Å. The exemplary film stack tabulated above, for example, can be used to produce a laminated glass assembly having the surprising combination of properties set forth in the preceding three paragraphs.

As described above, the coating 7 has a first dielectric-region ratio defined as the optical thickness of the first transparent dielectric film region divided by the optical thickness of the fourth transparent dielectric film region. When the thicknesses noted in the preceding paragraph are used, the first dielectric-region ratio can advantageously be selected so as to be less than 0.75, or even less than 0.7. This, however, is by no means required.

Additionally or alternatively, the thickness of the third infrared-reflection film region 300 can optionally be more than 5 Å less than the thickness of the second infrared-reflection film region 200, in combination with the thickness of the first infrared-reflection film region 100 being more than 20 Å less than the thickness of the second infrared-reflection film region.

As noted above, the laminated glass assembly 33 has an exterior side ES and an interior side IS. If desired, a transparent conductive coating can be provided on the exterior side, the interior side, or both. In such cases, the transparent conductive coating can comprises a transparent conductive oxide, such as indium tin oxide ("ITO"), fluorine-doped tin oxide, fluorine-doped zinc oxide, or the like. Exemplary transparent conductive coatings are described in U.S. patent application Ser. No. 13/006,992, entitled "High Quality Emission Control Coatings, Emission Control Glazings, and Production Methods," the teachings of which are incorporated herein by reference. In some cases, coatings can be applied to both surfaces of one or each pane 12, 12' by a sputter-up/sputter-down process carried out in a single coater. Heating, cleaning, and/or flash conditioning steps might be included in the production process.

Additionally or alternatively, it may be advantageous to provide the exterior side ES of the laminated glass assembly 33 with a surface-effect coating comprising a material that is photocatalytic, hydrophilic, or both. Suitable coatings are described in U.S. Pat. No. 7,294,404 and Ser. No. 11/129,820 and U.S. Pat. Nos. 7,713,632 and 7,604,865 and Ser. No. 11/293,032 and U.S. Pat. Nos. 7,862,910 and 7,820,309 and 7,820,296, the teachings of each of which are incorporated herein by reference. If desired, the surface-effect coating can be provided over a transparent conductive coating, as described in the above-noted U.S. patent application Ser. No. 13/006,992.

While some preferred embodiments of the invention have been described, it should be understood that various changes, adaptations and modifications may be made therein without departing from the spirit of the invention and the scope of the appended claims.

What is claimed is:

1. A laminated glass assembly including two panes and an interlayer, each of the two panes having an uncoated, exposed outer side surface, one of the panes having an interior major surface bearing a low solar transmittance coating, the low solar transmittance coating comprising a first infrared-reflection film region having a thickness, a second infrared-reflection film region having a thickness, and a third infrared-reflection film region having a thickness, the low solar transmittance coating comprising, in sequence moving away from said interior major surface and toward said interlayer:

a) a first transparent dielectric film region having an optical thickness;
   b) the first infrared-reflection film region;
   c) a second transparent dielectric film region having an optical thickness;
   d) the second infrared-reflection film region;
   e) a third transparent dielectric film region having an optical thickness;
   f) the third infrared-reflection film region; and
   g) a fourth transparent dielectric film region having an optical thickness;

the thicknesses of the three infrared-reflection film regions providing the laminated glass assembly with a solar transmittance of less than 0.34, a solar heat gain coefficient of about 0.36-0.38, and a visible transmittance of greater than 0.705,
   wherein the laminated glass assembly exhibits a Delta $T_{vis,lami}$ of less than 5%,
   the three infrared-reflection film regions having a combined thickness of greater than 300 Å in combination with the third infrared-reflection film region being thinner than the second infrared-reflection film region, the thickness of the first infrared-reflection film region being less than the thickness of the third infrared-reflection film region, the thickness of the first infrared-reflection film region being in a range from 85 to 140 Å, the thickness of the second infrared-reflection film region being in a range from 120 to 180 Å, and the thickness of the third infrared-reflection film region being in a range from 110 to 170 Å, the first infrared-reflection film region being thinner than the second infrared-reflection film region by at least 25 Å,
   wherein the low solar transmittance coating has a first reflection-region ratio of less than 0.80, the first reflection-region ratio defined as the thickness of the first infrared-reflection film region divided by the thickness of the second infrared-reflection film region,
   wherein the low solar transmittance coating has a first dielectric-region ratio defined as the optical thickness of the first transparent dielectric film region divided by the optical thickness of the fourth transparent dielectric film region, the first dielectric-region ratio being less than 0.75, and
   wherein the thickness of at least one of the infrared-reflection film regions is greater than 130 Å while the thickness of at least one of the other infrared-reflection film regions is less than 125 Å.

2. The laminated glass assembly of claim 1 wherein the laminated glass assembly is a bent automobile windshield, the two panes are both heat-bent glass, and the low solar transmittance coating is a heat-bent coating.

3. The laminated glass assembly of claim 1 wherein the combined thickness of the three infrared-reflection film regions is greater than 325 Å and the solar transmittance is less than 0.32.

4. The laminated glass assembly of claim 1 wherein the combined thickness of the three infrared-reflection film regions is greater than 350 521 and the visible transmittance is greater than 0.7075.

5. The laminated glass assembly of claim 1 wherein the combined thickness of the three infrared-reflection film regions is greater than 375 Å, the solar transmittance is less than 0.32, and the visible transmittance is in the range of about 0.71-0.72.

6. The laminated glass assembly of claim 1 wherein the first dielectric-region ratio is less than 0.7.

7. The laminated glass assembly of claim 1 wherein the laminated glass assembly has an exterior side and an interior side, the exterior side having a reflected color characterized by an $a_h$ color coordinate of between −3 and 1, and a $b_h$ color coordinate of between −5 and 0.

8. The laminated glass assembly of claim 1 wherein the thickness of the third infrared-reflection film region is more than 5 Å less than the thickness of the second infrared-reflection film region.

9. The laminated glass assembly of claim 1 wherein the thickness of said at least one of the other infrared-reflection film regions is less than 120 Å.

10. The laminated glass assembly of claim 1 wherein the first reflection-region ratio is less than 0.79.

11. The laminated glass assembly of claim 1 wherein the solar transmittance is about 0.29-0.3.

12. The laminated glass assembly of claim 1 wherein the fourth transparent dielectric film region comprises an outermost oxide layer over a nitride or oxynitride layer, the outermost oxide layer having a thickness of less than 75 Å.

* * * * *